United States Patent
Pena et al.

(10) Patent No.: US 10,696,418 B2
(45) Date of Patent: Jun. 30, 2020

(54) METHOD AND SYSTEM FOR REPRESENTATION OF FLIGHT EVENTS USING ICONS WITHIN A GRAPHICAL USER INTERFACE

(71) Applicant: HONEYWELL INTERNATIONAL INC., Morris Plains, NJ (US)

(72) Inventors: Joslenne Pena, Minneapolis, MN (US); Aaditi Vasudev Rokade, Navi Mumbai (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 34 days.

(21) Appl. No.: 16/000,214

(22) Filed: Jun. 5, 2018

(65) Prior Publication Data

US 2019/0367177 A1    Dec. 5, 2019

(51) Int. Cl.
| | | |
|---|---|---|
| *B64D 43/00* | (2006.01) | |
| *B64D 45/00* | (2006.01) | |
| *G07C 5/08* | (2006.01) | |
| *G08G 5/00* | (2006.01) | |
| *G06F 3/0481* | (2013.01) | |
| *G06F 3/0484* | (2013.01) | |

(52) U.S. Cl.
CPC ......... *B64D 43/00* (2013.01); *B64D 45/0005* (2013.01); *G06F 3/04817* (2013.01); *G07C 5/0841* (2013.01); *G08G 5/0021* (2013.01); *B64D 2045/0075* (2013.01); *G06F 3/04842* (2013.01); *G06F 3/04845* (2013.01)

(58) Field of Classification Search
CPC ................ B64D 43/00; B64D 45/0005; B64D 2045/0075; G06F 3/04817; G06F 3/04845; G06F 3/04842; G07C 5/0841; G07C 5/0825; G08G 5/0021
USPC .......................................................... 701/14
See application file for complete search history.

(56) References Cited

U.S. PATENT DOCUMENTS

| | | | |
|---|---|---|---|
| 8,731,810 B2 | 5/2014 | Conway | |
| 8,768,534 B2 | 7/2014 | Lentz | |
| 2011/0246002 A1 | 10/2011 | Shavit | |
| 2017/0210483 A1 | 7/2017 | Hamblin et al. | |
| 2017/0291715 A1* | 10/2017 | Jayathirtha | ............ B64D 45/00 |

OTHER PUBLICATIONS

"Aerobytes FDM/FOQA," Sep. 2014.
U.S. Department of Transportation Advisory Circular, "Flight Operational Quality Assurance," dated Apr. 12, 2004.

* cited by examiner

*Primary Examiner* — Brian P Sweeney
(74) *Attorney, Agent, or Firm* — Lorenz & Kopf, LLP

(57) ABSTRACT

Methods and systems are provided for displaying non-compliance with expected performance values for flight parameters of an aircraft. The method comprises collecting flight parameter data from the aircraft during aircraft operations and generating a graphical display of a flight path of the aircraft. The flight parameter data is compared with the expected performance values for the flight parameters of the aircraft and points of noncompliance by the aircraft are identified along its flight path. A graphical display icon is superimposed on each point of noncompliance on a graphical display of the flight path of the aircraft. The graphical display icon is a unique iconographic representation of the flight parameter. The flight path and the display icons are displayed on a graphical display device for review after completion of aircraft operations.

20 Claims, 6 Drawing Sheets

| EARLY TURN | EXCESSIVE HOLD TIME | TIRE LIMITING SPEED | VERTICAL DEVIATION |
| LOW RATE OF CLIMB | EXCESS ROLL DURING TAKEOFF | VERTICAL ACCEL | APPROACH SPEED |
| HIGH/LOW PITCH RATE | LATE THRUST REDUCTION | DISTANCE FROM THRESHOLD/ DEEP LANDING | CONFIG SPEED |
| EARLY CONFIG CHANGE | EARLY/LATE ELEVATOR INPUT | OVERWEIGHT LANDING | DESCENT RATE |
| LATE GEAR RETRACTION | RADAR | LATE SPOILER | EARLY ROTATION |

FIG. 1

METHOD AND SYSTEM FOR REPRESENTATION OF FLIGHT EVENTS USING ICONS WITHIN A GRAPHICAL USER INTERFACE

TECHNICAL FIELD

The present invention generally relates to aircraft operations, and more particularly relates to a method for representation of flight events using icons within a graphical user interface.

BACKGROUND

As aircraft data captured during flight becomes more abundant, it is necessary to effectively analyze and visualize this data to measure aircraft performance. Aircrew members and other users of such information must be able to receive the data related to aircraft performance in an efficient way on a graphical user interface (GUI). Hence, there is a need for a method and system for representation a flight events using icons within a graphical user interface.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for displaying non-compliance with expected performance values for flight parameters of an aircraft. The method comprises: collecting flight parameter data from the aircraft during aircraft operations; generating a graphical display of a flight path of the aircraft during aircraft operations; comparing the flight parameter data with the expected performance values for the flight parameters of the aircraft during aircraft operations; identifying points of noncompliance by the aircraft with the expected performance values for flight parameters along the flight path of the aircraft; superimposing a graphical display icon on each point of noncompliance by the aircraft on the graphical display of the flight path of the aircraft, where the graphical display icon comprises a unique iconographic representation of the flight parameter; and displaying the flight path and the display icons on a graphical display device for review after completion of aircraft operations.

A system is provided for displaying non-compliance with expected performance values for flight parameters of an aircraft. The system comprises: a plurality of flight data sensors aboard the aircraft that collect flight data parameter during aircraft operations; a computing device located onboard the aircraft, the computing device comprising a processor configured to, generate a graphical display of a flight path of the aircraft during aircraft operations, compare the flight parameter data with the expected performance values for the flight parameters of the aircraft during aircraft operations, identify points of noncompliance by the aircraft with the expected performance values for flight parameters along the flight path of the aircraft, superimpose a graphical display icon on each point of noncompliance by the aircraft on the graphical display of the flight path of the aircraft, where the graphical display icon comprises a unique iconographic representation of the flight parameter; and a graphical display device that displays the flight path and the display icons for review after completion of aircraft operations.

Furthermore, other desirable features and characteristics of the method and apparatus will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 1 shows a series of unique graphical display icon representations of a flight event in accordance with one embodiment;

DETAILED DESCRIPTION

Figure 2:
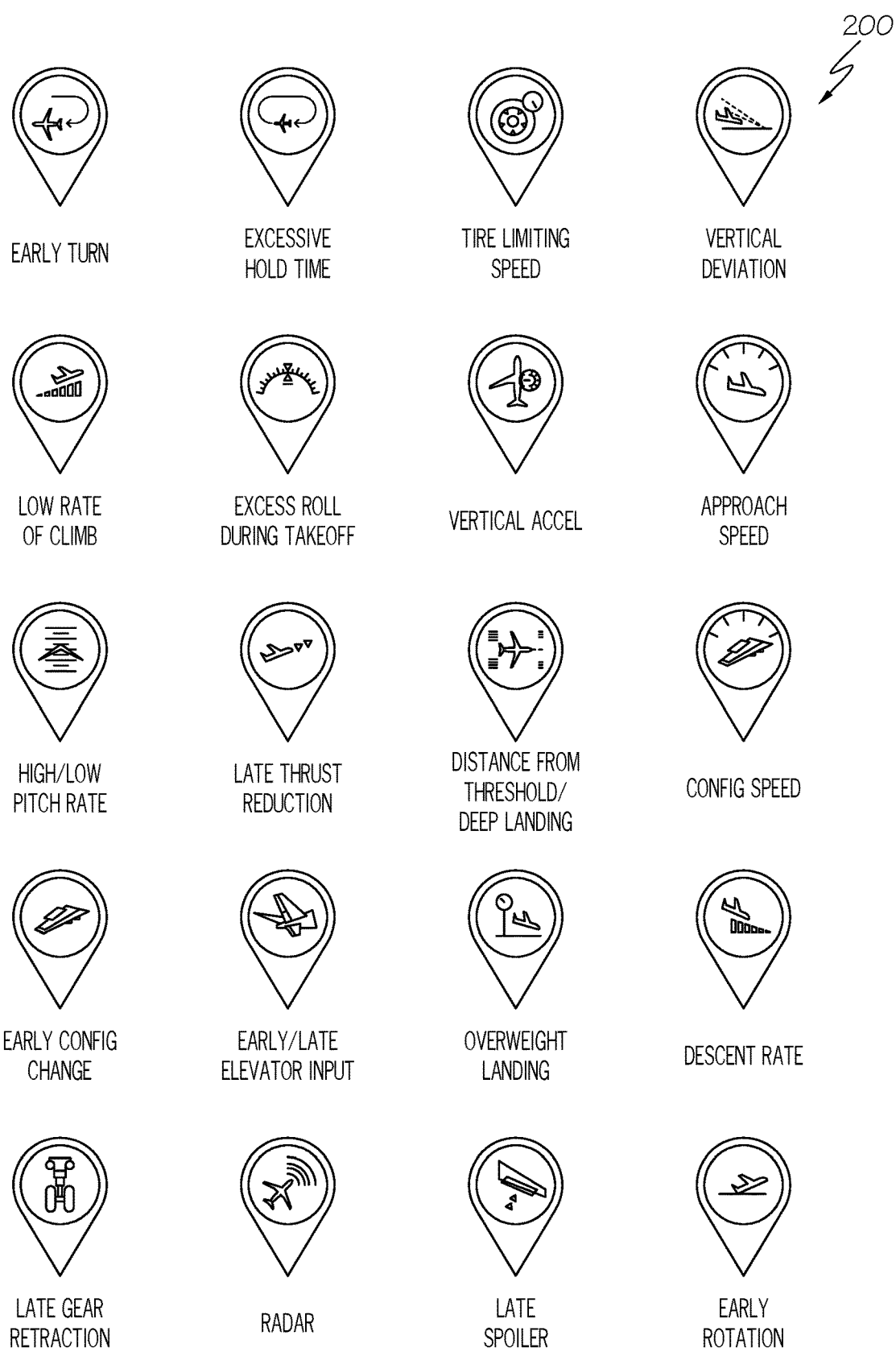
FIG. 2 shows a series of graphical map pins with unique graphical display icon representations for use with an electronic display of a flight event in accordance with one embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method for displaying non-compliance with expected performance values for flight parameters of an aircraft has been developed. The method involves collecting flight parameter data from the aircraft during aircraft operations. Next a graphical display of the flight path of the aircraft is generated. The flight parameter data is then compared with the expected performance values of the flight parameters of the aircraft and points of noncompliance are identified along the flight path. A graphical display icon is superimposed on each point of noncompliance on the graphical display. Each graphical display icon comprises a unique iconographic representation of the flight parameter. The flight path and the display icons are displayed on a graphical display device for review after completion of aircraft operations.

In some embodiments, the flight parameters that are measured are defined as Flight Operations Quality Assurance (FOQA) events. FOQA is a voluntary safety program that is designed to make commercial aviation safer by allowing commercial airlines and pilots to share de-identified aggregate information with the Federal Aviation Administration (FAA). The FAA can monitor national trends in aircraft operations and target its resources to address operational risk issues (e.g., flight operations, air traffic control (ATC), airports). The fundamental objective is to allow parties to identify and reduce or eliminate risks as well as minimize deviations from regulations. Examples of defined FOQA events and their descriptions are shown in Table 1 shown below:

TABLE 1

| EVENT NAME | EVENT DESCRIPTION | NOTES |
| --- | --- | --- |
| Excessive Power on the Ground | An event designed to measure high power settings on the ground that could result in injury to personnel or damage to equipment. | This event would also be used in the After Landing phase. |
| Excessive EGT - Start | An event designed to detect EGT in excess of flight manual limits during engine start. | This event could be included in other flight phases, if desired, although EGT exceedances other than on engine start are extremely rare. |
| Engine Overtemp | An event to detect engine EGT in excess of in-flight limits. | |
| Takeoff Warning | An event that would trigger on the same conditions that set off the takeoff warning horn. | On some newer aircraft, Takeoff Warning is a discrete parameter. Trim Setting is normally a component that triggers Takeoff Warning, but it is sometimes not a recorded parameter. |
| Rejected Takeoff - Low Speed | An event to detect that the takeoff roll has begun and the takeoff has been abandoned below a predetermined speed. | Low end should be greater than any anticipated taxi speed. 100 knots is generally accepted as the cutoff between high- and low-speed aborts. |
| Rejected Takeoff - High Speed | An event to detect that the takeoff roll has begun and the takeoff has been abandoned above a predetermined speed. | |
| Liftoff Speed High | An event to determine the relationship of the actual liftoff speed to V2. | V2 is calculated based on Gross Weight. |
| Liftoff Speed Low | An event to determine the relationship of the actual liftoff speed to V2. | V2 is calculated based on Gross Weight. |
| Pitch High at Takeoff | An event that measures pitch at takeoff in relation to the angle required to strike the tail of the aircraft. | Limits are based on the angle required for the tail cone to contact the ground with struts compressed. |

TABLE 1-continued

| EVENT NAME | EVENT DESCRIPTION | NOTES |
| --- | --- | --- |
| Takeoff Climb Speed High | An event to detect climb speed higher than desired during the Takeoff Phase of flight. | Altitude ranges should be used to accommodate different desired climb speeds in those ranges. In certain ranges, the climb airspeed will be based on V2. |
| Takeoff Climb Speed Low | An event to detect climb speed lower than desired during the Takeoff Phase of flight. | Altitude ranges should be used to accommodate different desired climb speeds in those ranges. |
| Early Flap Retraction | An event to detect any flap movement from the takeoff position prior to reaching the altitude at which flap retraction should begin | |
| Excessive Bank Angle at Takeoff | An event to detect when the bank angle exceeds the maximum allowable bank angle. | Altitude ranges should subdivide this event with different bank limitations in each range. |
| Turbulence - Flaps Extended | An event to detect excessive G-forces prior to flap retraction. | 1.5 g is a generally accepted limit for this type of event. This event can also occur during the Approach phase of flight. |
| Slow Initial Climb | An event to detect a slower than normal climb to the clean-up altitude. | |
| Abnormal Flap Retraction | An event to detect slow flap movement between any selected flap position and the previously selected flap position. | This event will also detect stuck flaps. |
| Height Loss in Climb | An event to detect an interruption in climb in which altitude is lost before the climb resumes. | This event might benefit from subdivision in altitude ranges. |
| Climb Speed High | An event to detect climb speed higher than 250 knots below 10,000 feet. | |
| Flap Limit Altitude | An event to detect when flaps are operated above the maximum allowable altitude for flap operation. | Altitude would correspond to the maximum operating altitude for flaps extended. |
| Turbulence - Flaps Up | An event to detect excessive G-force while airborne, indicating an encounter with turbulent conditions. | This event will measure turbulence from all sources (convective activity, clear air, or wake induced). Vertical Acceleration limits of +1.5 g to −0.5 g might be considered. |

TABLE 1-continued

| EVENT NAME | EVENT DESCRIPTION | NOTES |
|---|---|---|
| Holding/Excess Radar Vectoring | An event to detect excessive delays caused by ATC holding/radar vectoring. | The start point for this event would occur after the first 360-degree turn and end 600 seconds after the last turn. The event would trigger when the cumulative time exceeds a user defined value. |
| Operating Ceiling Exceeded | An event to detect operation of the aircraft above its certificated maximum operating altitude. | |
| Landing Gear Down Speed Exceeded (Mach) | The indicated mach number of the aircraft exceeds the maximum allowable mach for operation with the landing gear in the down position. | Limiting mach number would be MLE. |
| MMO Exceeded | An event to detect occurrences of the indicated mach number of the aircraft in excess of the maximum allowable mach number. | |
| VMO Exceeded | An event to detect occurrences of the indicated airspeed of the aircraft in excess of the maximum allowable airspeed. | |
| High Descent Rate | An event that measures unusually high rates of descent. | This event can be subdivided into altitude ranges to capture abnormal rates of descent that might be caused by different ATC facilities. |
| Excessive Speedbrake Usage | An event that measures the amount of time the speedbrake is used during descent. | This event is useful in evaluating arrival procedures into specific airports. |
| Approach Speed High | An event to detect operation on approach that is in excess of its computed final approach speed. | This event should be broken down into altitude bands. Suggested breakdown would be HAT >1,000 feet, HAT 500-1,000 feet, HAT 50-500 feet, HAT <50 feet. Speeds above 1,000 feet would reference a lookup table. |
| Approach Speed Low | An event to detect operation on approach that is below its computed final approach speed. | Speeds above 1,000 feet would reference a lookup table. |
| Excessive Power Increase | An event to detect an excessive power increase during final phase of approach. | |
| Abnormal Configuration - Flaps/Speedbrake | An event to detect the simultaneous use of flaps and speedbrakes. | This event would only be included if this type of operation were prohibited in the flight operations manual. |
| Abnormal Flap Extension | An event to detect slow flap movement between any selected flap position and the previously selected flap position. | This event will also detect stuck flaps. |
| Landing Gear Down Speed Exceeded (IAS) | An event to detect when the indicated airspeed of the aircraft exceeds the maximum allowable airspeed for operation with the landing gear in the down position. | |
| Late Landing Flaps | An event to detect flap movement to the landing flap position below a predetermined altitude. | This event is slightly different from Late Landing Configuration in that it detects flap movement below a set altitude rather than a flap setting. |
| Low Power on Approach | An event to detect aircraft engines not spooled or the power reduced to an unspooled condition below a predetermined altitude. | |
| Landing Gear Operation | An event to detect when the indicated airspeed of the aircraft exceeds the maximum allowable airspeed for operation of the landing gear in transit. | If the operating limitation is different for landing gear extension and retraction, separate events will need to be created for each limitation. |
| Operation Left of Localizer Centerline | An event to detect deviation left of localizer centerline. | |
| Operation Right of Localizer Centerline | An event to detect deviation right of localizer centerline. | |
| Operation Above Glideslope | An event to detect deviation above glideslope. | |
| Operation Below Glideslope | An event to detect deviation below glideslope. | |
| Descent Below MDA | An event to detect descent below MDA (followed by a climb back to MDA) on non-precision approaches | |
| Flap Limiting Speed | An event to detect flap operation at a speed that exceeds the maximum placarded airspeed. | This event will be constructed with a different speed limit for each flap setting through the use of a lookup table. It will also detect speed exceedances during retraction in the Takeoff phase of flight. |

TABLE 1-continued

| EVENT NAME | EVENT DESCRIPTION | NOTES |
|---|---|---|
| Go Around | An event to detect that the aircraft has begun its descent for landing, discontinues that descent, and does not land from that approach. | |
| ATC Go Around | An event to detect a go-around event in which no other events are triggered, such as approach instability, indicating the go around was directed by ATC. | |
| Late Landing Configuration | An event to detect that the aircraft is not configured with landing flaps and landing gear in the down and locked position at 500 feet HAT. | |
| Tire Limiting Speed | An event to detect if the tire limiting speed is exceeded. | |
| Pitch High - Landing | An event that measures pitch at landing in relation to the angle required to strike the tail of the aircraft. | Limits are based on the angle required for the tail cone to contact the ground with struts compressed |
| Pitch Low - Landing | An event that measures pitch attitude where the aircraft is in a nose down attitude that might result in an initial nose-gear touchdown or threepoint landing. | |
| Landing in a Crab | An event to detect failure to align aircraft with the runway at touchdown. | |
| Hard Landing | An event that measures excessive Gforce at touchdown, indicating a hard landing. | |
| Bounced Landing | An event that measures excessive Gforce at touchdown followed by a second excessive G-force, indicating a bounced, hard landing. | |
| Excessive Brake Usage | An event to detect higher-than-normal brake application. | A routine operational measurement (ROM) would be helpful to determine normal braking at a given airport. |
| Thrust Reverser Stowed | An event that measures the speed at which the thrust reverser is stowed during landing rollout. | |
| Overweight Landing | An event to detect landings made in excess of the maximum gross landing weight. | |
| Abnormal/Incorrect Landing Flaps | An event to detect that the aircraft touched down with flaps in a position less than the minimum expected landing flap setting. | Will need to be customized for the recommendations in the flight manual. |
| Runway/Taxi way Rough | An event that measures excessive G-force on the ground, indicating defects in runway/taxiway surfaces. | |

TABLE 1-continued

| EVENT NAME | EVENT DESCRIPTION | NOTES |
|---|---|---|
| Stick Shaker Operation | An event to detect stick shaker operation. | |
| GPWS Warning | An event to detect when a GPWS warning is triggered. | This event should be subdivided for each of the different warning modes of the GPWS. |
| Engine Failure | An event to detect inflight engine failure/shutdown. | |
| TCAS Advisory | An event to detect any TCAS advisory triggered. | This event should be separated for TCAS Traffic Advisories (TAs) and Resolution Advisories (RAs). |
| Engine Reverse at Low Speed | An event to detect use of engine reverse at low speed that can result in engine overtemps and/or FOD ingestion. | |

The events captured by flight data resources involve multiple conceptual mechanical flight parameters. It is advantageous to represent this high priority data in the simplest possible format on the GUI-based applications for easy and quick recognition by the users. This is especially true when the end-users need to act in an appropriate time based on the outcomes of this analysis. The need to articulate and communicate this information quickly and effectively is important as it has great impact on flight operations and performance.

The use of a graphical display icon is a technique of quickly and effectively communicating necessary flight parameter conditions across a wide variety of platforms including mobile applications, desktop applications, avionics display devices, etc. For example, a graphical display icon could be used on a mobile platform such as an electronic flight bag (EFB) or electronic tablet carried by an aircrew member. The graphical display icons typically require a library of intuitive representations to convey information about status, system behavior task action, or decision making processes especially during critical events.

A key aspect for quick and effective communication is using a "unique iconographic representation" of a flight parameter for each associated graphical display icon. Each iconographic representation would clearly communicate the specific flight parameter conditions with the simple visual recognition. Turning now to FIG. 1, examples of unique iconographic representations of flight parameters are shown. These flight parameters include: early turn; excessive hold time; tire limiting speed; vertical deviation; low rate of climb; excessive roll during take-off; vertical acceleration; approach speed; high/low pitch rate; late thrust reduction; distance from threshold/deep landing; configuration speed; early configuration change; early/late elevator input; overweight landing; dissent rate; late gear retraction; radar; late spoiler; and early rotation.

As can be seen, each of these iconographic representations is a separate graphical representation of the associated flight parameter that can visually and accurately convey to a user, the flight parameter associated with the icon in real time without cognitively overloading the user. While such iconographic representations may be standardized, it should be understood that these icons may be modified by a user in other embodiments. For example, a user may modify the resolution size, the color, and the symbol used to suit individual preferences and needs. The icons may be tailored to apply to different contextual situations such as fuel, passenger safety, specific flight phases, environmental/atmospheric conditions or automated technologies on board the aircraft.

In other embodiments, the unique iconographic representations may be used in various graphical formats such as map pins or event detail cards on a graphical display such as a flight path of the aircraft. For example, a map pin with an iconographic representation may further function with a "pop up" message which displays further flight parameter information upon selection of the map pin. Turning now to FIG. 2, examples 200 of map pins are shown that correspond to the unique iconographic representations previously shown in FIG. 1.

Figure 3:
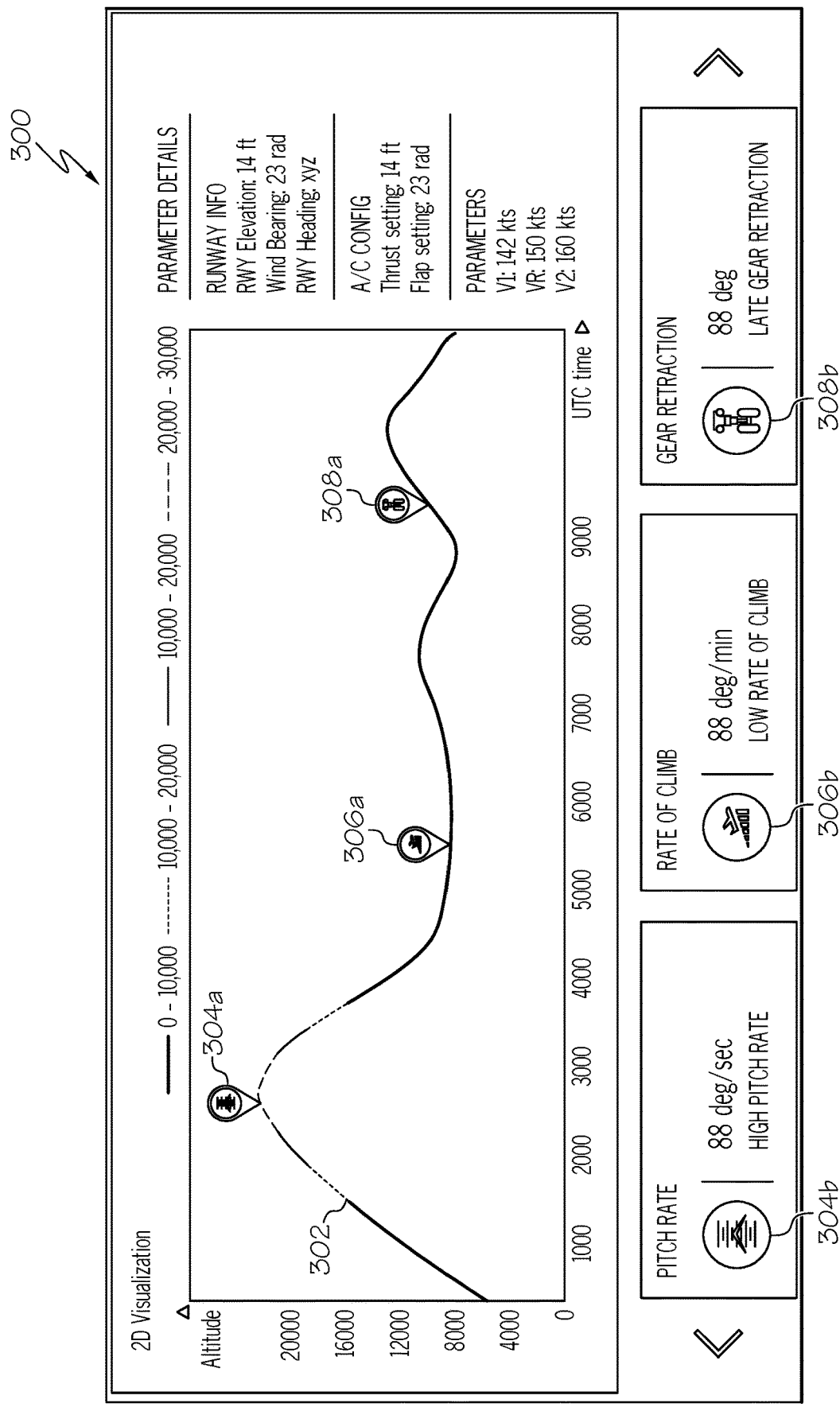
FIG. 3 shows a two-dimensional display of a flight path of an aircraft using graphical map pins of flight events in accordance with one embodiment.

Turning now to FIG. 3, a two-dimensional display 300 of a flight path 302 of an aircraft using graphical map pins 304a, 306a and 308a of flight events is shown in accordance with one embodiment. The display of the flight path 302 shows the altitude of the aircraft versus the time of the flight. Various display map pins 304a, 306a and 308a are shown at various points along the flight path that do not comply with expected performance values of the respective flight parameters. Each display map pin 304a, 306a and 308a has a corresponding event detail card 304b, 306b and 308b that provides more specific information concerning the noncompliance. In this example, the first map pin 304a indicates a noncompliant pitch rate of the aircraft while its corresponding detail card 304b shows a 88°/sec high pitch rate of the aircraft. The second display map pin 306a indicates a low rate of climb while its corresponding detail card 306b indicates a low rate of climb of 88 feet/minute. The third display map pin 308a indicates a late gear retraction of the aircraft while the corresponding detail card 308b indicates the landing gear retracted to 88°.

Figure 4:
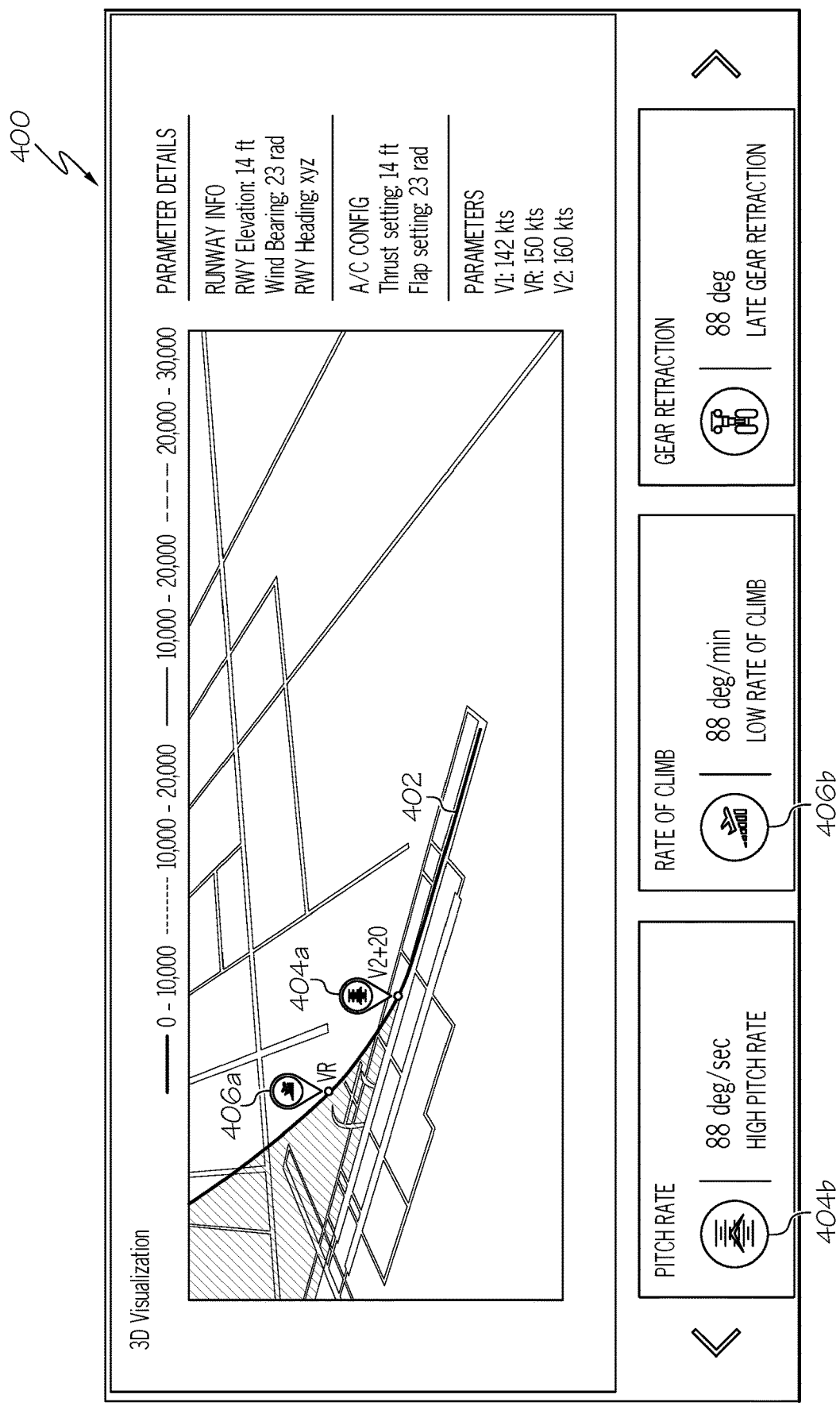
FIG. 4 shows a three-dimensional display of a flight path of an aircraft using graphical map pins of flight events in accordance with one embodiment.

Turning now to FIG. 4, a three-dimensional display 400 of a flight path 402 of an aircraft using graphical map pins 404a and 406a of flight events is shown in accordance with one embodiment. The display of the flight path 402 shows a three-dimensional visualization of an aircraft's flight path during takeoff. Two display map pins 404a and 406a are shown at various points along the flight path where the aircraft does not comply with expected performance values for the respective flight parameters. Each display map pin 404a and 406a has a corresponding event detail card 404b and 406b that provides more specific information concerning the noncompliant flight parameter. In this example, the first display map pin 404a indicates a noncompliant pitch rate of the aircraft while its corresponding detail card 404b shows details of a high pitch rate of 88°/sec. The second display map pin 406a indicates a low rate of climb while its corresponding detail card 406b shows details of a low rate of climb of 88 ft./min.

Figure 5:
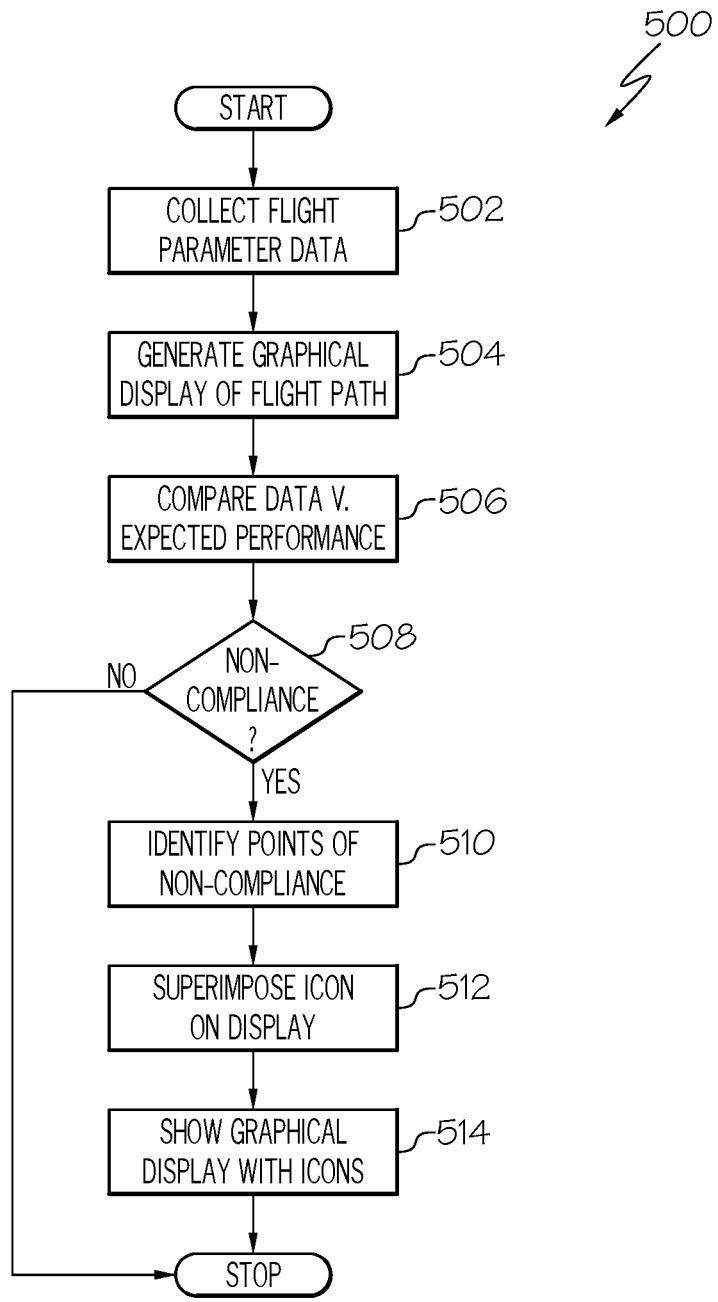
FIG. 5 shows a flowchart of a method for displaying noncompliance with expected performance values for flight parameters of an aircraft in accordance with one embodiment.

Turning now to FIG. 5, a flowchart 500 of a method for displaying noncompliance with expected performance values for flight parameters of an aircraft is shown in accordance with one embodiment. First, flight parameter data from the aircraft during aircraft operations is collected 502. A graphical display of the flight path of the aircraft is then generated 504. The flight parameter data is compared with the expected performance values for the flight parameters of the aircraft during aircraft operations 506. Any points of noncompliance are then identified 508. Once the points of noncompliance are identified 510, graphical display icons are superimposed on each point of noncompliance on the graphical display of the flight path 512. The graphical display icon is a unique iconographic representation of the flight parameter that quickly provides notice concerning the noncompliant flight parameter. The graphical display of the flight path and the display icons is then shown to a user to highlight the points of noncompliance by the aircraft along the flight path 514.

Figure 6:
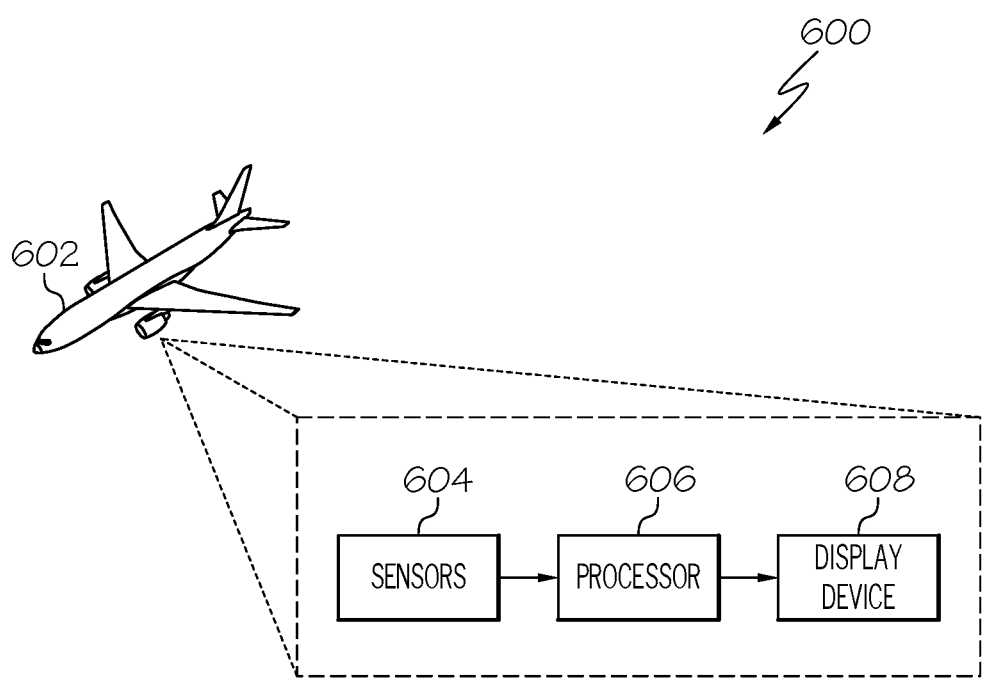
FIG. 6 shows a diagram of a system for displaying noncompliance with expected performance values for flight parameters of an aircraft in accordance with one embodiment.

Turning now to FIG. 6, a diagram of a system 600 for displaying noncompliance with expected performance values for flight parameters of an aircraft 602 in accordance with one embodiment. The system includes a plurality of flight data sensors 604 aboard the aircraft 602 that collect flight data parameters during aircraft operations. The flight data parameters are provided to a computing device with a processor 606 that: generates a graphical display of a flight path of the aircraft 602 during aircraft operations; compares the flight parameter data with the expected performance values for the flight parameters of the aircraft 602 during aircraft operations; identifies points of noncompliance by the aircraft 602 with the expected performance values for flight parameters along the flight path of the aircraft; and superimposes a graphical display icon on each point of noncompliance by the aircraft on the graphical display of the flight path of the aircraft 602, where the graphical display icon comprises a unique iconographic representation of the flight parameter. The graphical display is provided to a graphical display device 608 that displays the flight path and the display icons for review after completion of aircraft operations.

In some embodiments, the display of the flight path and the display icons may be saved in used as part of a post-flight analysis of an individual aircraft. In other embodiments, multiple displays may be saved and analyzed as part of analysis of multiple aircraft operations for a fleet or an airport. In still other embodiments, the display and the icons may be shown in real time to aircrew members on board the aircraft. This display may serve as an alert to noncompliance with expected flight parameters for the aircrew.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for displaying non-compliance with expected performance values for flight parameters of an aircraft, comprising:
    collecting flight parameter data from flight data sensors on board the aircraft during aircraft operations;
    generating a graphical display of a flight path of the aircraft during aircraft operations with an onboard computing device;
    comparing the flight parameter data with the expected performance values for the flight parameters of the aircraft during aircraft operations with an onboard computing device;
    identifying points of noncompliance by the aircraft with the expected performance values for flight parameters along the flight path of the aircraft with the onboard computing device;
    superimposing a graphical display icon on each point of noncompliance by the aircraft on the graphical display of the flight path of the aircraft with the onboard computing device, where the graphical display icon comprises a unique symbol of the flight parameter that communicates the flight parameter noncompliance by visual recognition; and
    displaying the flight path and the display icons on a graphical display device for review after completion of aircraft operations.

2. The method of claim 1, where the graphical display of a flight path is a two-dimensional display.

3. The method of claim 1, where the graphical display of a flight path is a three-dimensional display.

4. The method of claim 1, where the points of noncompliance by the aircraft are defined as Flight Operations Quality Assurance (FOQA) events.

5. The method of claim 1, where the graphical display icon comprises a digital map pin.

6. The method of claim 5, where the digital map pin displays pop-up details of the point of noncompliance by the aircraft when selected by a user.

7. The method of claim 1, where the unique symbol of the flight parameter of the graphical display icon may be modified by a user.

8. The method of claim 7, where the resolution size of the unique symbol is modified by the user.

9. The method of claim 7, where the color of the unique symbol is modified by the user.

10. The method of claim 7, where the symbol of the unique symbol is modified by the user.

11. The method of claim 7, where the details of the point of noncompliance displayed on a pop-up of the unique symbol is modified by the user.

12. The method of claim 1, where the review of the display of the flight path and the display icons are part of a post-flight analysis of the aircraft.

13. The method of claim 1, where the display of the flight path and the display icons on the graphical display device is shown in real time.

14. The method of claim 13, where the graphical display device is a mobile electronic device.

15. The method of claim 14, where the mobile electronic device is an electronic flight bag (EFB).

16. The method of claim 14, where the mobile electronic device is an electronic tablet.

17. The method of claim 13, where the real-time display functions as an alert for an aircrew member of the aircraft.

18. The method of claim 17, where the alert is for fuel status of the aircraft.

19. The method of claim 17, where the alert is for environmental conditions affecting the aircraft.

20. A system for the displaying non-compliance with expected performance values for flight parameters of an aircraft, comprising:
- a plurality of flight data sensors aboard the aircraft that collect flight data parameters during aircraft operations;
- a computing device located on-board the aircraft, the computing device comprising a processor configured to,
    - generate a graphical display of a flight path of the aircraft during aircraft operations,
    - compare the flight parameter data with the expected performance values for the flight parameters of the aircraft during aircraft operations,
- identify points of noncompliance by the aircraft with the expected performance values for flight parameters along the flight path of the aircraft, and
- superimpose a graphical display icon on each point of noncompliance by the aircraft on the graphical display of the flight path of the aircraft, where the graphical display icon comprises a symbol of the flight parameter that communicates the flight parameter noncompliance by visual recognition; and
- a graphical display device that displays the flight path and the display icons for review after completion of aircraft operations.

\* \* \* \* \*